(12) United States Patent
Hirano et al.

(10) Patent No.: US 10,315,388 B2
(45) Date of Patent: Jun. 11, 2019

(54) METHOD OF MANUFACTURING LAMINATE AND LAMINATE

(71) Applicant: NHK Spring Co., Ltd., Yokohama-shi (JP)

(72) Inventors: Satoshi Hirano, Kanagawa (JP); Jun Futakuchiya, Kanagawa (JP); Yasuaki Ishioka, Kanagawa (JP); Naoki Ito, Kanagawa (JP); Yohei Itami, Kanagawa (JP)

(73) Assignee: NHK Spring Co., Ltd., Yokohama-shi (JP)

( * ) Notice: Subject to any disclaimer, the term of this patent is extended or adjusted under 35 U.S.C. 154(b) by 66 days.

(21) Appl. No.: 15/308,717

(22) PCT Filed: May 29, 2015

(86) PCT No.: PCT/JP2015/065686
§ 371 (c)(1),
(2) Date: Nov. 3, 2016

(87) PCT Pub. No.: WO2015/190325
PCT Pub. Date: Dec. 17, 2015

(65) Prior Publication Data
US 2017/0145552 A1    May 25, 2017

(30) Foreign Application Priority Data

Jun. 11, 2014 (JP) ................................. 2014-120975

(51) Int. Cl.
*B32B 15/04* (2006.01)
*B32B 38/00* (2006.01)
(Continued)

(52) U.S. Cl.
CPC ............ *B32B 15/043* (2013.01); *B32B 38/00* (2013.01); *C23C 4/02* (2013.01); *C23C 4/11* (2016.01);
(Continued)

(58) Field of Classification Search
None
See application file for complete search history.

(56) References Cited

U.S. PATENT DOCUMENTS 3,794,551 A * 2/1974 Cline et al. ......... C04B 35/5805
                                                    109/83
4,588,607 A    5/1986 Matarese et al.
(Continued)

FOREIGN PATENT DOCUMENTS

CN    101974754 A    2/2011
EP     1674595 A2    6/2006
(Continued)

OTHER PUBLICATIONS

Thermal and Mechanical Properties of Aluminum Alloy Composite Reinforced with Potassium Hexatitanate Short Fiber; Materials Transactions; vol. 56, No. 1 (2015); pp. 160-166.*
(Continued)

*Primary Examiner* — Michael P. Rodriguez
(74) *Attorney, Agent, or Firm* — Locke Lord LLP

(57) ABSTRACT

A method of manufacturing a laminate in which a spray coating film made of a material different from a base material is laminated on the base material includes: a base material heating step of heating the base material; an intermediate layer forming step of forming, on a surface of the heated base material, an intermediate layer made of a material different from the base material and the spray
(Continued)

coating film; and a spray coating film forming step of forming the spray coating film on a surface of the intermediate layer.

7 Claims, 7 Drawing Sheets

(51) Int. Cl.
| | |
|---|---|
| C23C 4/02 | (2006.01) |
| C23C 24/04 | (2006.01) |
| C23C 28/00 | (2006.01) |
| C23C 4/11 | (2016.01) |
| C23C 4/123 | (2016.01) |
| C23C 28/02 | (2006.01) |

(52) U.S. Cl.
CPC .............. *C23C 4/123* (2016.01); *C23C 24/04* (2013.01); *C23C 28/02* (2013.01); *C23C 28/321* (2013.01); *C23C 28/345* (2013.01); *B32B 2255/06* (2013.01)

(56) References Cited

U.S. PATENT DOCUMENTS

| | | | |
|---|---|---|---|
| 4,885,213 A * | 12/1989 | Miyamoto | C23C 4/02 428/612 |
| 5,204,189 A | 4/1993 | Ueyama et al. | |
| 9,153,463 B2 | 10/2015 | Futakuchiya et al. | |
| 2005/0279186 A1 | 12/2005 | Leigh et al. | |
| 2006/0035019 A1 | 2/2006 | Leigh et al. | |
| 2006/0048605 A1 | 3/2006 | Leigh et al. | |
| 2011/0177358 A1 * | 7/2011 | Horton | C22C 1/02 428/640 |
| 2013/0029177 A1 | 1/2013 | Song | |
| 2013/0134148 A1 | 5/2013 | Tachikawa et al. | |
| 2013/0230723 A1 | 9/2013 | Bamberg et al. | |

FOREIGN PATENT DOCUMENTS

| | | |
|---|---|---|
| EP | 2612954 A2 | 7/2013 |
| JP | 53-085735 A | 7/1978 |
| JP | 60-009867 A | 1/1985 |
| JP | 61-087859 A | 5/1986 |
| JP | 61-143576 A | 7/1986 |
| JP | 61-207566 A | 9/1986 |
| JP | 63-118058 A | 5/1988 |
| JP | 02-011750 A | 1/1990 |
| JP | 10-265932 A | 10/1998 |
| JP | 11-124688 A | 5/1999 |
| JP | 2001-288553 A | 10/2001 |
| JP | 2002-173757 A | 6/2002 |
| JP | 2004-232499 A | 8/2004 |
| JP | 2006-002253 A | 1/2006 |
| JP | 2007-170376 A | 7/2007 |
| JP | 2008-038896 A | 2/2008 |
| JP | 2008-302317 A | 12/2008 |
| JP | 2009-249645 A | 10/2009 |
| JP | 2012-246802 A | 12/2012 |
| JP | 2014-013874 A | 1/2014 |
| TW | 201323197 A | 6/2013 |
| WO | 2013/042635 A1 | 3/2013 |

OTHER PUBLICATIONS

Office Action dated Nov. 3, 2016, issued for the Taiwanese patent application No. 104118723.
Z. Zurecki et al., "Automated Substrate Cooling System for HVOF Coating Operations," Thermal Spray Jan. 1, 2008, Crossing Corders, pp. 206-211. (cited in the Jan. 3, 2018 EP Search Report).
Search Report dated Jan. 3, 2018, issued for the European patent application No. 15807326.2.
Decision to Grant a Patent dated Nov. 14, 2017, issued for the corresponding Japanese patent application No. 2014-120975 and English translation thereof.
International Search Report dated Aug. 18, 2015, issued for PCT/JP2015/065686.
Offing Yukio, "Thermal-spraying engineering manual", Japan Thermal Spraying Society, Jan. 25, 2010, first edition, pp. 350-351 and English translation thereof.
Decision of Refusal dated Jun. 20, 2017, issued for the Japnese patent application No. 2014-120975 and English translation thereof.
Shi-jun Deng, "High-performance Ceramic Coating, First edition" Chemical Industry Press, Beijing, People's Republic of China. Jan. 31, 2004 p. 534. (cited in the Apr. 3, 2018 OA issued for CN201580029873.8).
Office Action dated Apr. 3, 2018, issued for the Chinese patent application No. 201580029873.8 and English translation thereof.
Office Action dated Nov. 6, 2018, issued for corresponding Japanese patent application No. 2017-180170 and English Translation thereof.

* cited by examiner (a) T=T0

| SAMPLE | INTERMEDIATE LAYER CONDITION | | | SPRAY COATING FILM HEAT RESISTANCE TEMPERATURE | | | |
|---|---|---|---|---|---|---|---|
| | FILM THICKNESS ($\mu$m) | BASE MATERIAL TEMPERATURE (°C) | FILM QUALITY | 300°C | 350°C | 400°C | 450°C |
| FIRST REFERENCE EXAMPLE | 130 | ROOM TEMPERATURE | DENSENESS | ○ | × | | |
| FIRST EXAMPLE | 130 | 400 | DENSENESS | ○ | ○ | × | |
| SECOND EXAMPLE | 300 | 400 | COARSENESS | ○ | ○ | ○ | × |

METHOD OF MANUFACTURING LAMINATE AND LAMINATE

FIELD

The present invention relates to a method of manufacturing a laminate in which a spray coating film is laminated on a base material, and a laminate.

BACKGROUND

A laminate obtained by laminating a material different from the base material on the base material is used for various applications depending on the combination of materials. For example, the laminate obtained by laminating ceramic or cermet on an aluminum base material by thermal spraying is used for a substrate supporting device or a stage heater which adjusts the temperature of the semiconductor substrate in a semiconductor manufacturing process.

Meanwhile, when a thermal expansion coefficient of the base material is different from a thermal expansion coefficient of the spray coating film formed on the base material, if the base material is heated during use of the laminate, crack may occur in the spray coating film due to stress. In order to suppress an occurrence of such a crack or increase the temperature at which the crack begins to occur, a technique of alleviating the stress by providing a material having a thermal expansion coefficient between the base material and the spray coating film or a porous material having low rigidity as an intermediate layer has been known. Further, Patent Literature 1 discloses a technique of suppressing an occurrence of tensile stress in the spray coating film when heating the base material, by performing the thermal spraying on a plate portion serving as the base material at a work temperature which generates the residual stress at which the crack does not occur in actual use temperature of the substrate supporting device.

CITATION LIST

Patent Literature

Patent Literature 1: Japanese Laid-open Patent Publication No. 2014-13874

SUMMARY

Technical Problem

According to the technique disclosed in Patent Literature 1, it is possible to obtain an effect of suppressing the crack of the spray coating film to a certain degree of temperature. However, depending on the applications of the laminate, the base material may be heated to higher temperatures. Therefore, a technique capable of further increasing the temperature at which the crack begins to occur on the spray coating film when heating the base material is desired.

The present invention has been made in view of the above circumstances, and an object thereof is to provide a method of manufacturing a laminate in which a spray coating film made of a material different from a base material is formed on the base material, and a laminate in which a temperature at which the crack starts to occur on the spray coating film when heating the base material is increased to be higher than before.

Solution to Problem

To solve the above-described problem and achieve the object, a method of manufacturing a laminate according to the present invention, in which a spray coating film made of a material different from a base material is laminated on the base material, includes: a base material heating step of heating the base material; an intermediate layer forming step of forming, on a surface of the heated base material, an intermediate layer made of a material different from the base material and the spray coating film; and a spray coating film forming step of forming the spray coating film on a surface of the intermediate layer.

The above-described method of manufacturing a laminate is characterized in that compressive stress is accumulated in the intermediate layer at the time of start of the spray coating film forming step.

The above-described method of manufacturing a laminate is characterized by further including a base material lowering step of lowering a temperature of the base material until stress in the intermediate layer becomes compressive stress, after the intermediate layer forming step.

The above-described method of manufacturing a laminate is characterized in that, in the base material heating step, the base material is heated in a range from ⅕ or higher of a melting point of the base material to the melting point or lower of the base material.

The above-described method of manufacturing a laminate is characterized in that, in the intermediate layer forming step, the intermediate layer is formed so that porosity of the intermediate layer is 3% or more.

The above-described method of manufacturing a laminate is characterized in that, in the intermediate layer forming step, the intermediate layer is formed so that a thickness of the intermediate layer is in a range from 100 μm or more to 800 μm or less.

The above-described method of manufacturing a laminate is characterized in that, in the intermediate layer forming step, powders of material of the intermediate layer and a gas are accelerated toward the surface of the heated base material, and the powders are sprayed and deposited on the surface of the base material, while being kept in a solid phase state.

The above-described method of manufacturing a laminate is characterized in that, in the intermediate layer forming step, the material of the intermediate layer is thermally sprayed onto the surface of the heated base material.

A laminate according to the present invention includes: a base material; an intermediate layer made of a material different from the base material; and a spray coating film which is made of a material different from the base material and the intermediate layer, and is formed on a surface of the intermediate layer, wherein compressive stress is accumulated in the intermediate layer at room temperature.

The above-described laminate is characterized in that porosity of the intermediate layer is 3% or more.

The above-described laminate is characterized in that a thickness of the intermediate layer is in a range from 100 μm or more to 800 μm or less.

The above-described laminate is characterized in that the base material is made of a metal or an alloy, and the spray coating film is made of ceramic or cermet.

The above-described laminate is characterized in that the intermediate layer is formed by accelerating powders of the material different from the base material and a gas toward a surface of the base material, and by spraying and depositing the powders onto the surface of the base material, while being kept in a solid phase state.

The above-described laminate is characterized in that the intermediate layer is formed by thermally spraying a material different from the base material onto the surface of the base material.

Advantageous Effects of Invention

According to the present invention, since an intermediate layer is formed on the base material while heating the base material and a spray coating film is formed on the surface of the intermediate layer, it is possible to increase a temperature at which the crack starts to occur on the spray coating film when heating the base material to be higher than before.

BRIEF DESCRIPTION OF DRAWINGS

FIG. 7 is a table illustrating preparation conditions and evaluations of a sample in the example and a reference example according to the present invention.

DESCRIPTION OF EMBODIMENTS

Hereinafter, the embodiments of the present invention will be described in detail with reference to the accompanying drawings. The present invention is not limited by the following embodiments. Also, each drawing referred to in the following description merely schematically illustrates the shape, the size and the positional relationship to the extent capable of understanding the contents of the present invention. That is, the present invention is not limited only to the shape, the size, and the positional relationship exemplified in each drawing.

Embodiment

Figure 1:
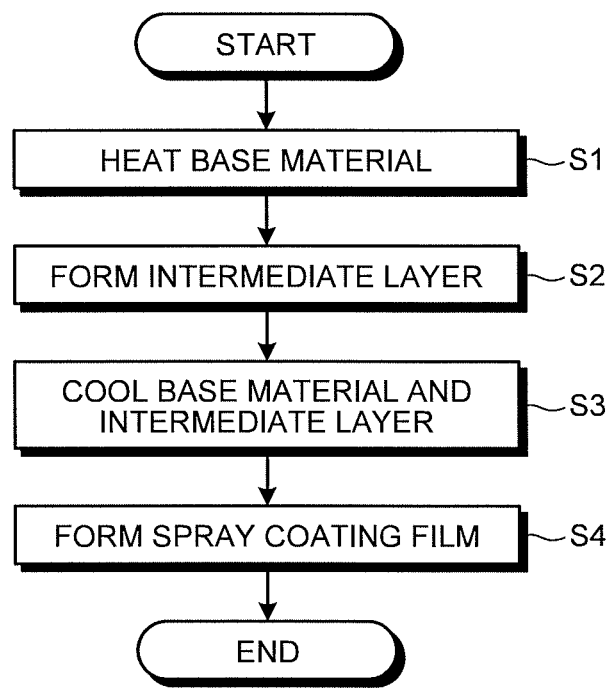
FIG. 1 is a flowchart illustrating a method of manufacturing a laminate according to an embodiment of the present invention.
Figure 2:
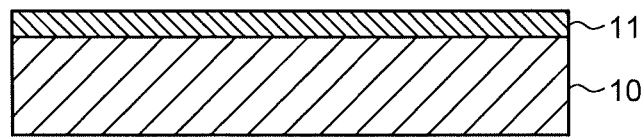
FIG. 2 is a schematic diagram illustrating the method of manufacturing the laminate according to the present embodiment and a stress state of the laminate.
Figure 2:
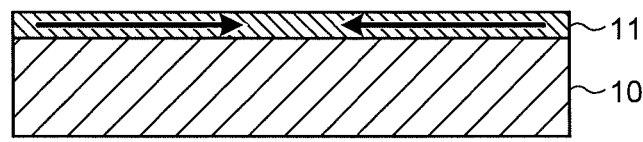
Figure 2:
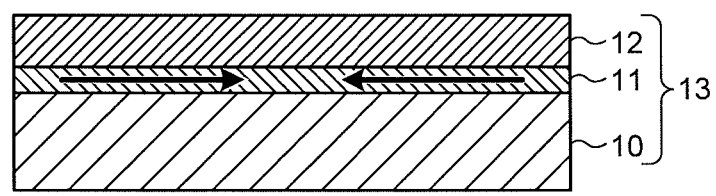
Figure 2:
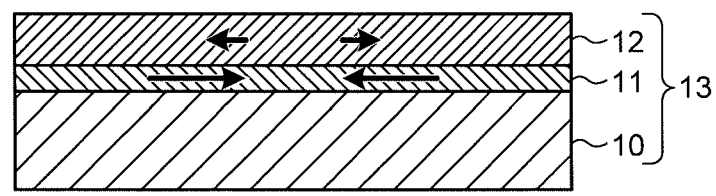
Figure 2:
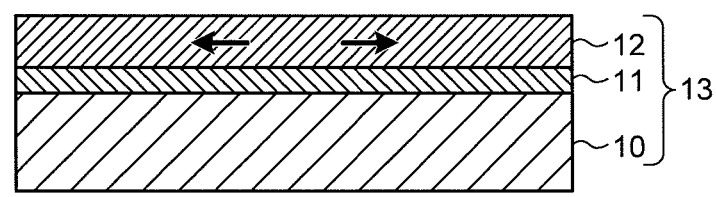

FIG. 1 is a flowchart illustrating a method of manufacturing a laminate according to an embodiment of the present invention. FIG. 2 is a schematic diagram illustrating the method of manufacturing the laminate according to the present embodiment and the stress state in the laminate.

First, in step S1, a base material 10 of a laminate is provided and heated. The material of the base material 10 is not particularly limited as long as the material is a metal or an alloy. For example, depending on the use of the laminate, it is possible to use copper, copper alloys, zinc, zinc alloys, aluminum, aluminum alloys, magnesium, magnesium alloys, nickel, nickel alloys, iron, iron alloys, iron-nickel alloys, stainless steel, titanium, titanium alloys, chromium, chromium alloys, niobium, niobium alloys, molybdenum, molybdenum alloys, silver, silver alloys, tin, tin alloys, tantalum, tantalum alloys or the like.

A heating method of the base material 10 is not particularly limited, and the base material 10 may be simply placed on a hot plate that is set to a predetermined temperature. Further, the temperature (set temperature) for heating the base material 10 is preferably set in a range from ⅕ or higher of the melting point of the base material 10 to the melting point or lower, and the base material 10 is preferably heated to a temperature that is assumed when using the completed laminate. The temperature T of the base material 10 at this time is set as T=T0.

In a subsequent step S2, as illustrated in FIG. 2(a), while heating the base material 10, an intermediate layer 11 is formed on the surface of the base material 10. In this embodiment, the intermediate layer 11 is formed by a cold spraying method.

As the material of the intermediate layer 11, a metal or an alloy having a thermal expansion coefficient between the base material 10 and a spray coating film formed in a subsequent step S4 is used. For example, the material of the intermediate layer 11 may be suitably selected according to the combinations of the materials of the base material 10 and the spray coating film, from copper, copper alloys, zinc, zinc alloys, aluminum, aluminum alloys, magnesium, magnesium alloys, nickel, nickel alloys, nickel-aluminum alloys, iron, iron alloys, iron-nickel alloys, stainless steel, titanium, titanium alloys, chromium, chromium alloys, niobium, niobium alloys, molybdenum, molybdenum alloys, silver, silver alloys, tin, tin alloys, tantalum, tantalum alloys or the like.

The cold spraying method is a film forming method of injecting powders of metal or alloy in a state of a melting point or a softening point or lower, and an inert gas from a nozzle, and causing the powders and the inert gas to collide with the base material in a solid phase state, thereby forming a film on the surface of the base material. In the cold spraying method, as compared to the thermal spraying method of spraying the powders of the material to the base material by melting the powders, the film formation is performed at low temperatures. Therefore, according to the cold spraying method, it is possible to alleviate the effects of thermal stress, and it is possible to obtain a metal film in which oxidation is also suppressed without any phase transformation.

Figure 3:
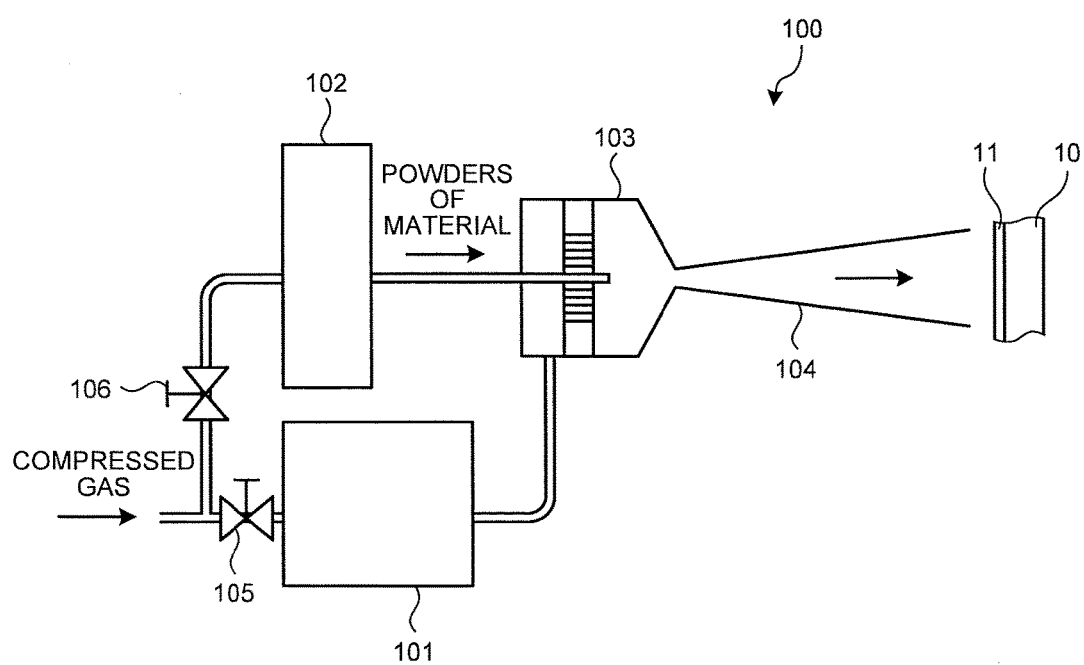
FIG. 3 is a schematic diagram illustrating an example of a configuration of a film forming device according to a cold spraying method.

FIG. 3 is a schematic diagram illustrating a configuration example of a film forming device according to the cold spraying method, a so-called cold spraying device. A cold spraying device 100 illustrated in FIG. 3 includes a gas heater 101 that heats the compressed gas, a powder feeder 102 that houses the powders of the material of the film and supplies the powders to a spray gun 103, a gas nozzle 104 that injects the powders of the material supplied to the spray gun 103 and the heated compressed gas toward the base material 10, and valves 105 and 106 that regulate an amount of supply of compressed gas to the gas heater 101 and the powder feeder 102.

As the compressed gas, an inert gas such as helium, nitrogen and air is used. The compressed gas supplied to the gas heater 101 is supplied to the spray gun 103, after being heated to a temperature of a range that is lower than the melting point of the powders of the material. The heating temperature of the compressed gas is preferably in a range from 300 to 900° C.

Meanwhile, the compressed gas supplied to the powder feeder 102 supplies the powders of material of the powder feeder 102 to the spray gun 103 to a predetermined discharge rate.

The heated compressed gas is injected at an approximately supersonic flow of 340 m/s or more by passing through the gas nozzle 104 having a divergent shape. The gas pressure of the compressed gas at this time is preferably in a range approximately from 1 to 5 MPa. The reason is that it is possible to improve the adhesion strength of the film, that is, the intermediate layer 11 to the base material 10, by adjusting the pressure of the compressed gas to such an extent. More preferably, the compressed gas may be treated with a pressure in a range approximately from 2 to 4 MPa.

In such a cold spraying device 100, the base material 10 is disposed on a downstream side in an injection direction of the spray gun 103, the powders of the material of the intermediate layer 11 are charged to the powder feeder 102, and the supply of the compressed gas to the gas heater 101 and the powder feeder 102 is started. Thus, the powders supplied to the spray gun 103 are charged into the supersonic flow of the compressed gas to be accelerated, and are injected from the spray gun 103. The powders collide with the base material 10 at high speed while being kept in the solid phase state and are deposited to form the intermediate layer 11.

In such a cold spraying method, when the powders of material collide with an under layer, that is, the base material 10 and the film formed earlier, a plastic deformation occurs to obtain an anchor effect. At the same time, each oxide film is destroyed and the metallic bond caused by newly formed surfaces occurs. Accordingly, it is possible to form the intermediate layer 11 having high adhesion strength with the base material 10. Therefore, it is possible to determine whether the intermediate layer 11 is formed by the cold spraying method, by observing the presence or absence of the anchor layer at the interface between the base material 10 and the intermediate layer 11, a laminated state of the powders and the like.

Here, while forming the intermediate layer 11, in some cases, the temperature of the base material 10 may change from the set temperature in the step S1, but it does not cause a problem. In short, heating may be continued at the set temperature, and there is no need to strictly maintain the base material 10 itself at a constant temperature.

It is preferable that the thickness of the intermediate layer 11 be approximately in a range from 100 μm or more to 800 μm or less. More preferably, the thickness may be approximately in a range from 200 μm or more to 500 μm or less. Further, the density among the film qualities of the intermediate layer 11 may be preferably relatively coarse, and specifically, the porosity may be preferably 3% or more, and more preferably may be 5% or more. The film thickness and the porosity of the intermediate layer 11 can be controlled, by appropriately adjusting the film formation conditions such as the relative scanning speed between the spray gun 103 and the base material 10, the pressure of the compressed gas, and the flow rate of the powders of material.

Further, as long as it is possible to form a film by causing the powders of material to collide with the base material 10, while being kept in the solid phase state, the cold spraying device is not limited to the configuration illustrated in FIG. 3. Further, in the step S2, as long as it is possible to form a film of metal or alloy which has the film thickness and the porosity of the aforementioned ranges and has high adhesion strength to the base material 10, the intermediate layer 11 may be formed by a method other than the cold spraying method. Hereinafter, the film of metal or alloy will be collectively referred to as a metal film. Specifically, a metal film formed by the thermal spraying method may also be used the intermediate layer 11.

In a subsequent step S3, as illustrated in FIG. 2(b), the base material 10 and the intermediate layer 11 are cooled to a temperature T1 (T1<T0, for example, a room temperature) that is lower than the temperature at the time of formation of the intermediate layer 11. Further, the room temperature is in the vicinity of 25° C. At this time, cooling may be positively performed, for example, by blowing the air toward the base material 10 formed with the intermediate layer 11, and the base material 10 may be only left in the room temperature. When cooling the base material 10 and the intermediate layer 11, the compressive stress, that is, a negative stress remains on the intermediate layer 11.

In the subsequent step S4, as illustrated in FIG. 2(c), a spray coating film 12 is formed on the surface of the intermediate layer 11. As the material of the spray coating film 12, a ceramic-based material, and a mixed material of metal and ceramics are used.

As the ceramic material, for example, it is possible to use oxide ceramics such as alumina, magnesia, zirconia, yttria, yttria-stabilized zirconia, steatite, forsterite, mullite, titania, silica and sialon, non-oxide ceramics such as aluminum nitride, silicon nitride, silicon carbide, titanium nitride, titanium carbide, titanium carbonitride, titanium aluminum nitride, titanium chromium nitride, chromium nitride, zirconium nitride, chromium carbide and tungsten carbide, or a BCN-based super hard material such as boron carbide and boron nitride.

As the mixed material of metal and ceramics, it is possible to use ceramics such as oxides, nitrides, carbides and borides, specifically, mixed materials which contain the aforementioned ceramic material as the main component, and contain a metal or an alloy as a binder phase or tie, a so-called cermet. For example, a mixed material in which the metal powders such as cobalt or nickel are dispersed in the powders of tungsten carbide as the tie may be used. Alternatively, materials such as mixed composition of yttria stabilized zirconia (YSZ) and nickel (Ni)-chromium (Cr) alloy may be used.

While the spray coating film 12 is formed, since the material melted by the spray coating flame is sprayed into the intermediate layer 11, the base material 10 and the intermediate layer 11 enter a heated state, for example, approximately in a range from 70 to 80° C. Therefore, compressive stress remaining on the intermediate layer 11 becomes slightly smaller than the state illustrated in FIG. 2(b). The temperature T of the base material 10 at this time is set as T=T2 (T1≤T2<T0).

The surface of the intermediate layer 11 formed by the cold spraying method forms a complex convex shape toward the outside. Therefore, the material of the melted spray coating film 12 enters a narrow recessed portion between the protrusions of the surface of the intermediate layer 11 to improve the anchor effect of the spray coating film 12. Thus, the intermediate layer 11 and the spray coating film 12 are firmly bonded to each other to obtain a high adhesion strength. Therefore, even by observing the interface between the intermediate layer 11 and the spray coating film 12, it is possible to determine whether the intermediate layer 11 is formed by the cold spraying method.

Thus, a laminate 13 illustrated in FIG. 2(c) is completed. Here, after the formation of the spray coating film 12, when the temperature of the laminate 13 is lowered, the compressive stress is generated in the intermediate layer 11. However, as described above, since the intermediate layer 11 and the spray coating film 12 are firmly bonded to each other, the high adhesion strength is maintained.

Figure 4:
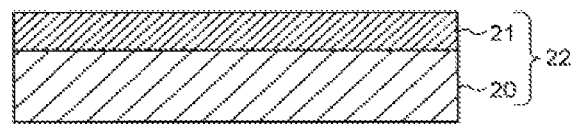
FIG. 4 is a schematic diagram illustrating a stress state in the laminate manufactured by a conventional method.
Figure 4:
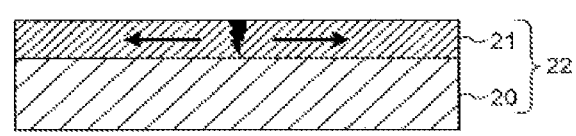
Figure 5:
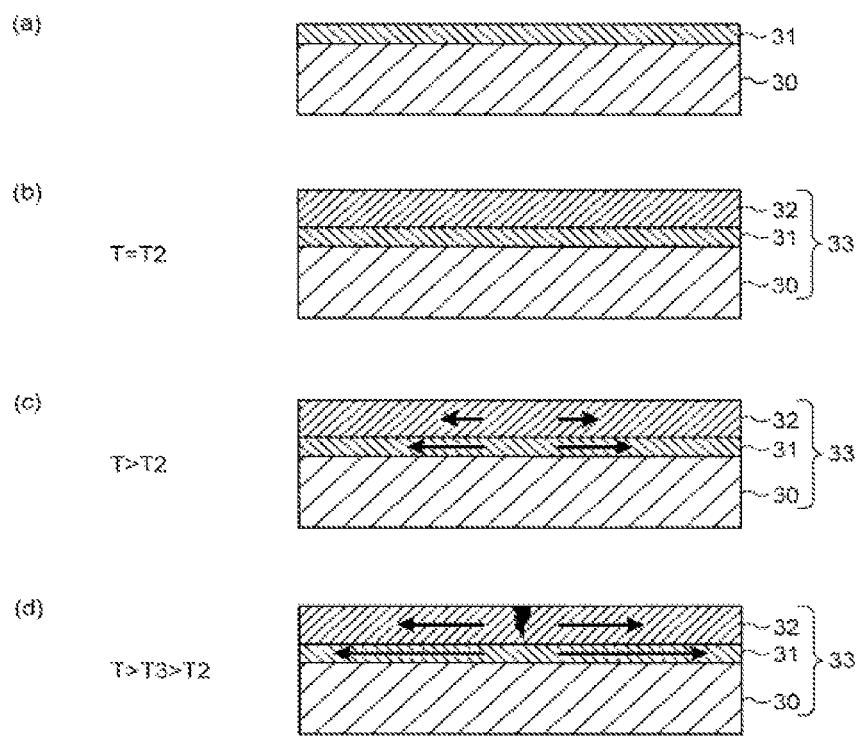
FIG. 5 is a schematic diagram illustrating a stress state in the laminate manufactured by a conventional method.
Figure 6:
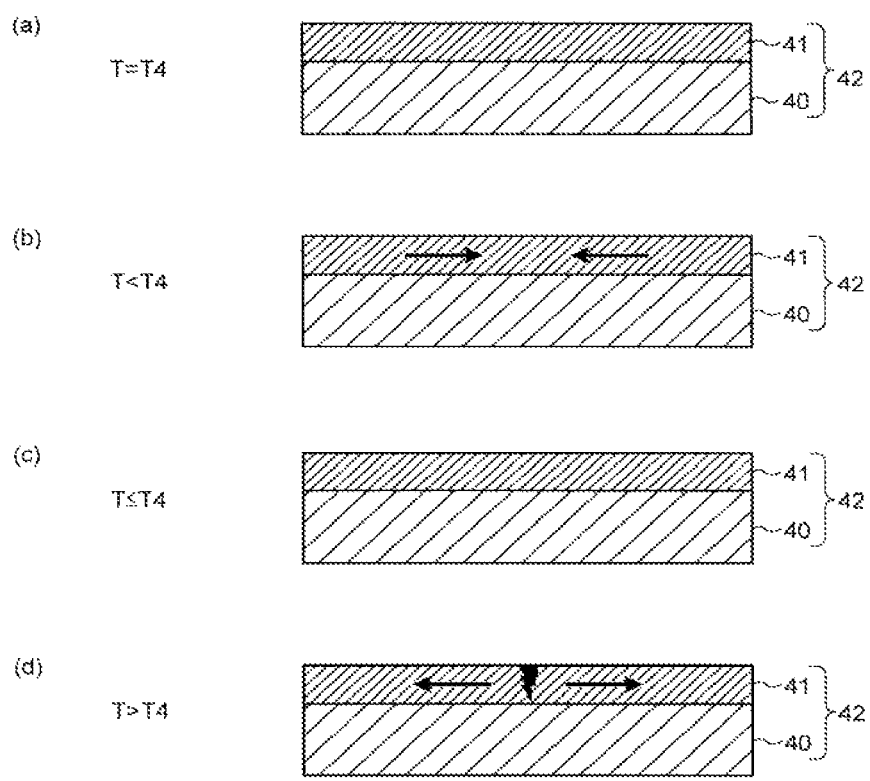
FIG. 6 is a schematic diagram illustrating a stress state in the laminate manufactured by a conventional method.

Next, the stress state in the laminate 13 illustrated in FIG. 2 will be described by comparison with FIGS. 4 to 6. FIGS. 4 to 6 are schematic diagrams illustrating a stress state in the laminate manufactured by a conventional method. The arrows illustrated in each drawing illustrate the internal stresses in the layer on which the arrows are indicated. Specifically, the outward arrows indicate the tensile stress, and the inward arrows indicate the compressive stress.

As illustrated in FIG. 4(a), the case of manufacturing a laminate 22 by directly forming a spray coating film 21 on a base material 20 at room temperature condition will be described. When forming the spray coating film 21, by spraying the molten material onto the base material 20, the base material 20 is slightly heated. The temperature T of the base material 20 at this time is set as T=T2.

When heating the base material 20 side of the laminate 22, as illustrated in FIG. 4(b), due to the influence of thermal expansion of the base material 20, a tensile stress is generated on the spray coating film 21. When the temperature T of the base material 20 is higher than the temperature T2 at the time of formation of the spray coating film 21, the crack occurs in the spray coating film 21.

The case of manufacturing a laminate 33 by forming an intermediate layer 31 on a base material 30 of the room temperature condition as illustrated in FIG. 5(a) and by forming a spray coating film 32 on the intermediate layer 31 as illustrated in FIG. 5(b) will be considered. The intermediate layer 31 may be formed by the cold spraying method as in the above embodiment, and may be formed by the thermal spraying method.

As illustrated in FIG. 5(c), when heating the base material 30 side of the laminate 33, due to the influence of thermal expansion of the base material 30, a tensile stress is generated on the intermediate layer 31 and the spray coating film 32. Of these, the tensile stress generated in the spray coating film 32 is alleviated by the intermediate layer 31 interposed between the spray coating film 32 and the base material 30. Therefore, even when the temperature T of the base material 30 is made higher than the temperature (T=T2) at the time of formation of the spray coating film 32 (T>T2), the crack of the spray coating film 32 can be prevented to some extent. However, as illustrated in FIG. 5(d), when the temperature T of the base material 30 is further increased (T>T3>T2), the effect of alleviating the tensile stress caused by the intermediate layer 31 reaches limit, and the crack occurs in the spray coating film 32.

As illustrated in FIG. 6(a), the case of forming a spray coating film 41 while heating a base material 40 to a temperature T4 at the time of use of a laminate 42 will be considered. In this case, as illustrated in FIG. 6(b), when cooling the laminate 42, for example, to the vicinity of the room temperature after the formation of the spray coating film 41, a state in which compressive stress remains on the spray coating film 41 occurs.

As illustrated in FIG. 6(c), when heating the base material 40 side of the laminate 42, due to the influence of thermal expansion of the base material 40, the compressive stress remaining on the spray coating film 41 is gradually reduced. This effect continues until the temperature T of the base material 40 reaches a temperature T4 at the time of formation of the spray coating film 41. Therefore, until the temperature T of the base material 40 reaches the temperature T4 at the time of formation of the spray coating film 41, it is possible to heat the base material 40, without causing the crack on the spray coating film 41.

However, as illustrated in FIG. 6(d), when the temperature T of the base material 40 exceeds the temperature T4, the stress of the spray coating film 41 changes to the tensile stress from the compressive stress. Therefore, when the base material 40 is continuously heated, the crack occurs on the spray coating film 41.

Further, as illustrated in FIG. 6(c), when the laminate 42 is used at the temperature T4 or lower, there is no problem even when the spray coating film 41 is directly formed on the base material 40, without providing the intermediate layer. Therefore, in order to enhance the heat resistance of the spray coating film 41 at the time of the use of the laminate 42, it is conceivable to raise the base material temperature T4 at the time of formation of the spray coating film 41. However, when the spray coating film 41 is formed of ceramics, if the base material temperature T4 increases, at the time of returning the temperature of the laminate 42 to the approximately room temperature after the formation of the spray coating film 41 (see FIG. 6(b)), there is concern that the spray coating film 41 peels off from the base material 40 due to the influence of heat contraction of the base material 40. Although the base material temperature T4 at which peeling occurs when returning to the room temperature depends on the combinations of the material of the base material 40 and the material of the spray coating film 41, for example, when forming an alumina spray coating film on an aluminum base material, if the base material temperature T4 is set to approximately 200° C., peeling occurs. Therefore, in this case, it is not possible to greatly increase the base material temperature T4.

In contrast with the laminates 22, 33 and 42 manufactured by the conventional methods, in the laminate 13 according to this embodiment, it is possible to heat the base material 10 to a higher temperature, without causing crack in the spray coating film 12. That is, as described above, in the vicinity of the room temperature, compressive stress remains in the intermediate layer 11 (see FIG. 2(c)). Therefore, as illustrated in 2(d), when heating the base material 10 side of the laminate 13, the intermediate layer 11 also gradually expands due to the influence of thermal expansion of the base material 10, and the compressive stress remaining in the intermediate layer 11 is gradually reduced. As illustrated in FIG. 2(e), this effect continues until the temperature of the base material 10 reaches the base material temperature T0 at the time of formation of the intermediate layer 11. At this time, although the tensile stress begins to occur in the spray coating film 12 due to the influences of the thermal expansion and the rigidity of the intermediate layer 11, an increase in the tensile stress is very gentle as compared to the spray coating films 21, 32 and 41 illustrated in FIGS. 4 to 6.

Thus, in the laminate 13 according to the present embodiment, it is possible to heat the base material 10 to the base material temperature T0 at the time of formation of the intermediate layer 11 or a temperature exceeding that temperature, without causing crack on the spray coating film 12.

As the conditions of the intermediate layer 11 usable as a substrate of the spray coating film 12, there is a condition in which the intermediate layer is not peeled off from the base material when cooling the temperature of the base material to the approximately room temperature after formation of the intermediate layer, even in the case of forming the intermediate layer by heating the base material to the use temperature (see FIG. 6(d)) at which peeling is caused when directly forming the spray coating film on the base material. As such an intermediate layer, a metal film formed by the cold spraying method or the thermal spraying method described above is suitably used. Among them, the metal film obtained by the thermal spraying method can be used as the intermediate layer, when the adhesion strength of the metal film to the base material is higher than the adhesion strength of the spray coating film of ceramic serving as an upper layer.

Further, the effect of alleviating the tensile stress in the spray coating film 12, in other words, the effect of suppressing the crack of the spray coating film 12 when heating the laminate 13 becomes larger, as the film quality of the intermediate layer 11 is coarse, and as the film thickness of the intermediate layer 11 is thick. However, when the intermediate layer 11 is too thick, since the thickness of the laminate 13 itself increases, the film thickness of the intermediate layer 11 is preferably approximately in a range from 100 μm to 800 μm, and more preferably approximately in a range from 200 μm to 500 μm.

EXAMPLES

Hereinafter, an example according to the present invention will be described with reference to FIG. 7. FIG. 7 is a table illustrating the preparation conditions and evaluations of the samples in examples and reference examples according to the present invention.

(1) Preparation of Sample

As examples and reference examples according to the present invention, three kinds of samples illustrated in FIG. 7 were prepared. The materials of each layer constituting each sample were as follows.

Base material: aluminum (melting point: approximately 660° C.)

Intermediate layer: Ni-5 wt % Al

Spray coating film: alumina ($Al_2O_3$)

In the first and second examples and the first reference example, the thickness of the intermediate layer, the heating temperature of the base material at the time of formation of the intermediate layer, and the density among the film qualities of the intermediate layer were changed. Among the film qualities illustrated in FIG. 7, "coarseness" indicates that the porosity of the intermediate layer is 3% or more, and "denseness" indicates that the porosity of the intermediate layer is less than 3%. Further, the spray coating film was subjected to cutting until the thickness becomes 135 μm after the film formation.

(2) Evaluation of Sample

Each sample was placed on a hot plate, and heating was performed from the base material side. After heating the sample to each set temperature (300° C., 350° C., 400° C. and 450° C.), the sample was naturally cooled to the room temperature, and the presence or absence of crack in the spray coating film was checked by the color check. The symbol x in the column of the spray coating heat resistant temperature illustrated in FIG. 7 indicates that the crack occurs in the spray coating film at that temperature, and the symbol ○ indicates that the crack does not occur in the spray coating film at that temperature.

First Example

In the first example, while heating the base material to 400° C., an intermediate layer having a film thickness of approximately 130 μm and a dense film quality was formed. In this case, even if the base material of the laminate was heated to 350° C., the crack did not occur in the spray coating film.

Second Example

In the second example, while heating the base material to 400° C., an intermediate layer having a film thickness of approximately 300 μm and a coarse film quality was formed. In this case, even if the base material of the laminate was heated to 400° C., crack did not occur in the spray coating film.

First Reference Example

In the first reference example, an intermediate layer having a film thickness of approximately 130 μm and a dense film quality was formed, without heating the base material, that is, while being kept at room temperature. In this case, when heating the base material of the laminate to 350° C., crack occurred in the spray coating film.

From these experimental results, it is possible to improve the heat resistance temperature of the spray coating film by forming the intermediate layer, while heating the base material. Specifically, when comparing the first example to the first reference example, it was confirmed that the heat resistance temperature of the spray coating film was improved in the case of increasing the base material temperature at the time of formation of the intermediate layer.

Further, when comparing the first example to the second example, it was possible to improve the heat resistance temperature of the spray coating film when the film thickness of the intermediate layer is increased. This is considered to be due to the fact that, by increasing the thickness of the intermediate layer, the influence of the thermal expansion of the base material on the spray coating film becomes gentler when heating the sample. Furthermore, when the film quality of the intermediate layer made coarse, it was possible to further improve the heat resistance temperature of the spray coating film. This is considered to be due to the fact that, by the coarse intermediate layer, the influence of the thermal expansion of the base material on the spray coating film also becomes gentler.

REFERENCE SIGNS LIST 10, 20, 30, 40 BASE MATERIAL
11, 31 INTERMEDIATE LAYER
12, 21, 32, 41 SPRAY COATING FILM
13, 22, 33, 42 LAMINATE
100 COLD SPRAYING DEVICE
101 GAS HEATER
102 POWDER FEEDER
103 SPRAY GUN
104 GAS NOZZLE
105, 106 VALVE

The invention claimed is:

1. A method of manufacturing a laminate in which a spray coating film made of a material different from a base material is laminated on the base material, the method comprising:
heating a base material made of a metal or an alloy;
forming, on a surface of the heated base material, an intermediate layer made of a material different from the base material and the spray coating film, wherein the intermediate layer is made of a metal or an alloy and has a thermal expansion coefficient between those of the base material and the spray coating film;
lowering a temperature of the base material until stress in the intermediate layer becomes compressive stress, after the forming of the intermediate layer; and
forming the spray coating film on a surface of the intermediate layer in a state where a temperature of the base material is lowered at the lowering operation, wherein the spray coating film is formed of a ceramic-based material, or a mixed material of metal and ceramics.

2. The method of manufacturing a laminate according to claim 1, wherein compressive stress is accumulated in the intermediate layer at the time of start of the spray coating film forming step.

3. The method of manufacturing the laminate according to-claim 1, wherein, in the base material heating step, the base material is heated in a range from ⅕ or higher of a melting point of the base material to the melting point or lower of the base material.

4. The method of manufacturing the laminate according to-claim 1, wherein, in the intermediate layer forming step, the intermediate layer is formed so that porosity of the intermediate layer is 3% or more.

5. The method of manufacturing the laminate according to-claim 1, wherein, in the intermediate layer forming step, the intermediate layer is formed so that a thickness of the intermediate layer is in a range from 100 µm or more to 800 µm or less.

6. The method of manufacturing the laminate according to-claim 1, wherein, in the intermediate layer forming step, powders of material of the intermediate layer and a gas are accelerated toward the surface of the heated base material, and the powders are sprayed and deposited on the surface of the base material, while being kept in a solid phase state.

7. The method of manufacturing the laminate according to-claim 1, wherein, in the intermediate layer forming step, the material of the intermediate layer is thermally sprayed onto the surface of the heated base material.

\* \* \* \* \*